INVENTOR
ALFRED KREIDLER.
BY
ATTORNEY.

2,893,553

APPARATUS FOR THE PRODUCTION OF HOLLOW METALLIC ARTICLES

Alfred Kreidler, Stuttgart, Germany

Application October 5, 1956, Serial No. 614,261

Claims priority, application Germany December 27, 1951

1 Claim. (Cl. 207—3)

The present invention relates to the production of bodies, more particularly hollow bodies, with eyes, lugs, bands or in other forms and one or more preferably extended continuations all of plastic materials, more particularly light metal.

The present invention is a continuation-in-part of the copending patent application Serial No. 326,425, filed December 17, 1952, now abandoned.

It is one object of the present invention to provide for rapid and cheap production of such bodies, the combination of an extrusion step with a die-pressing operation in such a way that a stamping is inserted into a die used as a holder moulding the eyes, lugs, bands or the like and provided with outlets for the extensions to be formed and is extruded by one or more punches penetrating into the die, if necessary using mandrels, so that the moulds of the die are first filled with displaced material and then one or more rope-like extensions are extruded.

The combination of extrusion and die-pressing operations is already known in principle, namely, for the production of bodies, of simple form, such as rivets, head screws and the like in which more or less only the moulding residue left over in the extrusion operation receives a definite shape. Hitherto, more complicated constructional shapes in which the holder must have stamped recesses, have not been attempted.

A form of the process extending the possible applications consists in the feature that the punch or punches penetrate the cross-section of the material having the eyes, lugs, bands or the like and extrude a corresponding part of the material past the eyes, lugs, bands, etc., through the matrix to the hollow or solid rope-like extensions. The finished bodies then have an uninterrupted grain and therewith an inner texture connection of the head part bearing the projections with the extruded parts.

In many cases it is advantageous to combine with the extrusion operations in the direction of pressing a flow operation backwards against the direction of pressing, the material thus flowing out on the one hand in the form of one or more lengths, preferably in the direction of pressing and, on the other hand, preferably flowing back against the direction of pressing, if necessary until the die is filled up.

With regard to the apparatus used, depending upon the shape of the body to be produced, it is advisable, or even necessary, to construct the die in several parts. It can also be closed off by a special matrix which has a correspondingly sectioned outlet for the extension.

It is another object of the present invention to provide a favorable variation in which the apparatus can be constructed for the execution of the method in such a way that the holder, of usual construction with smooth walls, is closed off by a tool, the surfaces of which, turned towards the holder space, form the die producing the eyes, lugs, bands or the like, the extrusion apertures for the rope-like part being worked into the base of the die. Finally, the press punch can, in addition be shaped, preferably on its frontal surface, like a stamping or imprinting block.

With these and other objects in view which will become apparent in the following detailed description, the present invention will be clearly understood in connection with the accompanying drawings, in which.

Figure 1:
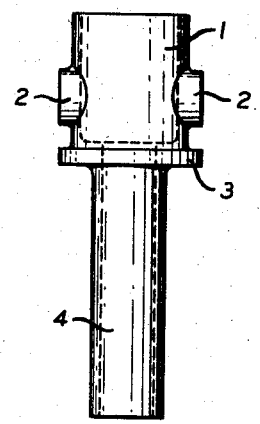
Figure 1 is a side elevation of the body to be produced.

The body to be produced consists (Fig. 1) of a hollow cylindrical head part 1 with lateral eyes 2 and a band 3, with a tubular extension 4 extending in axial direction.

Figure 2:
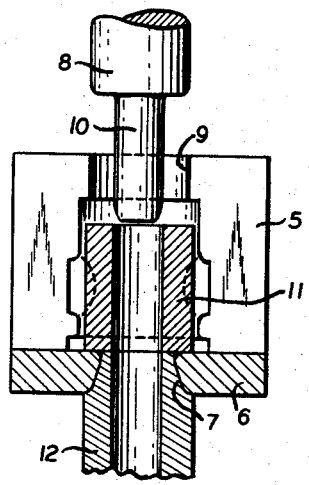
Fig. 2 is a vertical section partly in side elevation showing a pressing device with an inserted stamping before the beginning of the pressing operation.
Figure 3:
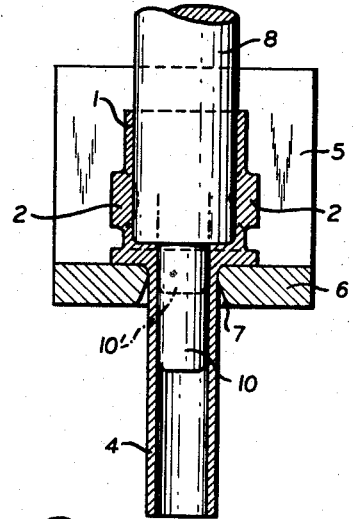
Fig. 3 is a view similar to Fig. 2 but at the end of the pressing operations.

For the production of this body a two-part die 5 is used which is illustrated in Figs. 2 and 3, divided in the plane of the drawing. The hollow space of the die corresponds to the outer shape of the head part 1 with the eyes 2 and the band 3. The die 5 is closed off at the bottom by a matrix 6 with a round outlet 7 for the extruded length. The press punch 8 is guided in the upper hollow 9 of the die 5. It has in addition a mandrel 10, the diameter of which corresponds to the inner diameter of the tubular extension 4. The stamping 11 is, in the present case, a thin walled hollow cylinder, the bore of which allows the mandrel 10 to pass through freely, or only with, certainly, comparatively slight, displacement of the material.

The displacement of the material occurring upon the penetration of the punch 8 into the stamping 11, which may be preheated in certain circumstances, fills the hollow spaces provided in the die for the eyes 2 and the band 3 and also rises in contra-flow to the pressing direction until the die is completely filled and also extrudes the pipe length 4 between the mandrel 10 and matrix 6. The end of the present operation, which is determined by stops (not shown) is illustrated in Fig. 3.

Moreover, the mandrel 10 need not be rigidly connected with the punch 8. It can—as is often the case in pipe extrusion—be movable by itself in the punch 8. It remains then, for example, after reaching the outlet 7 of the matrix 6, in the position 10' illustrated in chain-dotted lines in Fig. 3.

In one variation (Fig. 2), a press is used in which a hollow die 12 is inserted into the aperture 7 of the matrix 6, the inner diameter of which corresponds to the outer diameter of the mandrel 10, so that the latter may enter the hollow space of the hollow die 12. In this position, the hollow die together with the mandrel 10 closes up completely the aperture 7 in the matrix 6 during the first phase of the forming operation, which expedient is particularly of importance if projections as the eyes 2 are to be formed in the upper portion of the body. When then the die 5 is completely filled with the material of the stamping 11, the hollow die 12 is moved downwardly by using any conventional means, thereby, freeing the ring-like opening between the mandrel 10 and the matrix 6, to form the tubular extension 4 of the body.

Figure 4:
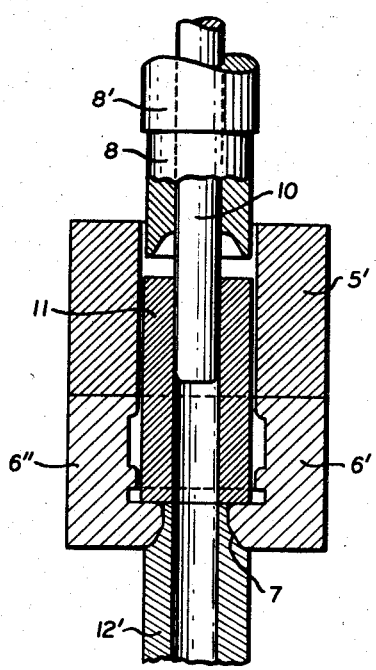
Fig. 4 is a vertical section partly in side elevation showing another pressing device with an inserted stamping at the beginning of the pressing operation.
Figure 5:
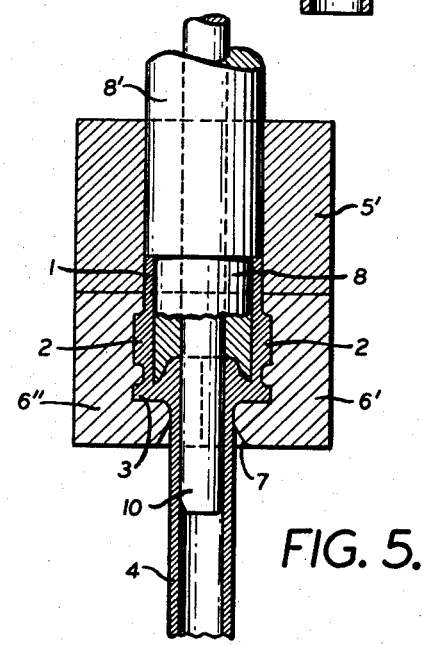
Fig. 5 is a view similar to Fig. 4 but at the end of the pressing operation.

In a variation (Figs. 4 and 5), a press is used having a hollow cylindrical holder 5' having the usual smooth walls. The holder is closed off by a two-part die-matrix 6', 6". The inner surface of the die-matrix forms a die for the production of eyes, lugs, bands or the like. It is advisable, in case, as illustrated, a comparatively long stamping must be extruded, for the mandrel 10 to be movable relative to the press punch 8. The press punch 8 itself has a thicker shaft 8' which fits into the holder 5'.

The stamping 11, constructed as a hollow cylinder, which may be previously heated if necessary, is inserted in the space surrounded by the holder 5' and the matrix 6', 6". Before the beginning of the actual pressing operation the mandrel 10 is passed so far through the stamping that it projects through the matrix aperture 7. Then the punch 8 is lowered and presses the material of the stamping 11 into the recesses of the die-matrix 6', 6", due to the fact that a hollow die 12' is inserted into the aperture 7 of the two-part die-matrix 6' and 6", similar to the hollow die 12 shown in Fig. 2, the inner diameter of the hollow die 12' corresponding with the outer diameter of the mandrel 10, so that the latter may enter the hollow space of the die 12'. In this position, the hollow die 12' together with the mandrel 10 closes up again completely the aperture 7 in the matrix 6' and 6" during the first phase of the forming operation. When the two-part die-matrix 6' and 6" is completely filled with the material of the stamping 11, and not before this stage is reached, the hollow die 12' is moved downwardly by any conventional means, thereby, freeing the ring-like opening between the mandrel 10 and the matrix 6' and 6", to permit the formation of the tubular extrusion 4 of the body. Upon continued lowering of the punch 8, the latter presses now the material of the stamping 11 as a pipe extrusion 4 through the annular gap between the now stationary mandrel 10 and the wall of the matrix aperture 7. At the end of the pressing operation, which is determined by stops (not shown), the stamping has assumed the shape shown in Fig. 5, i.e., it has the eyes 2, the band 3, and the tubular extension 4. Furthermore, the punch has also formed, with its retracted frontal surface, a circular projection on the inside of the hollow bodies.

By pressing the portion of the material moving into the extension 4 pressing past the parts forming the projection 2, 3, an uninterrupted course of the grain of the material is evident on the completion of the pressing operation. Correspondingly favorable properties of strength of the body produced are the result.

Bodies can, of course, also be produced, by the process of the invention, with several extensions and these with any possible form as the upper part suitable for die-pressing.

While I have disclosed two embodiments of the present invention, it is to be understood that these embodiments are given by example only and not in a limiting sense, the scope of the present invention being determined by the objects and the claim.

I claim:

An apparatus for the production of bodies of metal having a formed laterally extending projection and at least one extruded tubular extension comprising a multi-part first tubular die defining a die-pressing inner contour complementary to the shape of said bodies to be produced including at least one laterally extending cavity, said die being open at one end and having an extrusion opening at the opposite end, said first die receiving a tubular blank, an extrusion plunger having a mandrel adapted to be received in said blank, and a second tubular die having an inner diameter identical with the outer diameter of said mandrel, so that the movement of said plunger through said open end towards said extrusion opening will project its mandrel through said blank and said second tubular die to close the extrusion opening and upon application of pressure by said plunger on said blank the laterally extending cavities are filled by said blank and upon removal of said second tubular die and continued application of pressure a tubular extrusion through the free space defined by the opening of said first tubular die and said mandrel takes place.

References Cited in the file of this patent

UNITED STATES PATENTS

| 567,606 | McCool et al. | Sept. 15, 1896 |
| 1,916,645 | Taylor | July 4, 1933 |
| 2,024,286 | Handler | Dec. 17, 1935 |
| 2,055,534 | Hopkins | Sept. 29, 1936 |
| 2,225,902 | Cartwright | Dec. 24, 1940 |
| 2,389,876 | Sequin | Nov. 27, 1945 |
| 2,668,345 | Ecstein | Feb. 9, 1954 |
| 2,675,124 | Biginelli | Apr. 13, 1954 |

FOREIGN PATENTS

| 137,701 | Australia | June 26, 1950 |